United States Patent
Fell et al.

(10) Patent No.: US 11,365,990 B2
(45) Date of Patent: Jun. 21, 2022

(54) SENSOR DEVICE

(71) Applicant: FRABA B.V., SG Heerlen (NL)

(72) Inventors: Christian Fell, Robbinsville, NJ (US); Dimitri Pritzkau, Troisdorf (DE)

(73) Assignee: FRABA B.V., SG Heerlen (NL)

( * ) Notice: Subject to any disclaimer, the term of this patent is extended or adjusted under 35 U.S.C. 154(b) by 0 days.

(21) Appl. No.: 17/278,661

(22) PCT Filed: Sep. 25, 2018

(86) PCT No.: PCT/EP2018/076007
§ 371 (c)(1),
(2) Date: Mar. 23, 2021

(87) PCT Pub. No.: WO2020/064092
PCT Pub. Date: Apr. 2, 2020

(65) Prior Publication Data
US 2022/0034691 A1 Feb. 3, 2022

(51) Int. Cl.
*G01D 11/24* (2006.01)
*G01P 1/02* (2006.01)

(52) U.S. Cl.
CPC ............ *G01D 11/245* (2013.01); *G01P 1/02* (2013.01)

(58) Field of Classification Search
CPC ................................ G01D 11/245; G01P 1/02
See application file for complete search history.

(56) References Cited

U.S. PATENT DOCUMENTS 4,368,453 A * 1/1983 Herden ................. G01K 7/183
338/25

FOREIGN PATENT DOCUMENTS

| DE | 10 2010 051 973 A1 | 5/2012 | |
|---|---|---|---|
| DE | 102010051973 | * 5/2012 | |
| DE | 10 2016 201 204 A1 | 7/2016 | |
| DE | 10 2015 122 218 A1 | 6/2017 | |
| DE | 102015122218 A1 * | 6/2017 | ............ G01L 7/082 |
| DE | 102015122224 A1 * | 6/2017 | ............ G01F 1/684 |
| DE | 102015122608 A1 * | 6/2017 | ........... G01N 27/414 |
| DE | 10 2017 129 687 A1 | 8/2018 | |
| EP | 2 241 797 A2 | 10/2010 | |
| WO | WO-2005054827 A1 * | 6/2005 | ......... G01N 21/3504 |
| WO | WO 2016/096191 A1 | 6/2016 | |
| WO | WO-2016096191 A1 * | 6/2016 | ............ G01P 1/026 |
| WO | WO-2019186179 A1 * | 10/2019 | ............ A41D 1/002 |

* cited by examiner

Primary Examiner — Jamel E Williams
(74) Attorney, Agent, or Firm — Norman B. Thot

(57) ABSTRACT

A sensor device for detecting a physical variable. The sensor device includes a housing, a sensor module arranged in the housing, a potting compound which at least partially fills the housing and which encloses the sensor module, and at least one mounting element via which the sensor module is mounted to the housing. The sensor module includes a module board and at least one motion-sensitive sensor element which is arranged on the module board. The potting compound, in a cured state, has a hardness which is greater than a hardness of the at least one mounting element and less than a hardness of the housing.

9 Claims, 4 Drawing Sheets

SENSOR DEVICE

CROSS REFERENCE TO PRIOR APPLICATIONS

This application is a U.S. National Phase application under 35 U.S.C. § 371 of International Application No. PCT/EP2018/076007, filed on Sep. 25, 2018. The International Application was published in German on Apr. 2, 2020 as WO 2020/064092 A1 under PCT Article 21(2).

FIELD

The present invention relates to a sensor device for detecting a physical variable, the sensor device comprising a housing, a sensor module arranged in the housing, and a potting compound which at least partially fills the housing and which encloses the sensor module. The present invention further relates to a method for assembling such a sensor device.

BACKGROUND

Such a sensor device is, for example, described in DE 10 2016 201 204 A1. The described sensor device comprises a housing in which a sensor module having a motion-sensitive sensor element is arranged. The sensor module directly abuts a supporting device and is further connected to the housing via an essentially rigid output connector, such as, for example, a press fit pin. The housing is filled with a potting compound which encloses the sensor module for protecting the sensor module from the ingress of moisture.

Such sensor devices are frequently used in high-vibration and high-shock environments. In the sensor device described in DE 10 2016 201 204 A1, external vibrations and/or shocks can be transmitted to the sensor module via the housing, whereby the detecting accuracy and/or the detecting reliability of the sensor device can be negatively affected.

SUMMARY

An aspect of the present invention is to provide a sensor device which provides a reliable detecting of a physical variable, in particular in high-shock environments.

In an embodiment, the present invention provides a sensor device for detecting a physical variable. The sensor device includes a housing, a sensor module arranged in the housing, a potting compound which at least partially fills the housing and which encloses the sensor module, and at least one mounting element via which the sensor module is mounted to the housing. The sensor module comprises a module board and at least one motion-sensitive sensor element which is arranged on the module board. The potting compound, in a cured state, has a hardness which is greater than a hardness of the at least one mounting element and less than a hardness of the housing.

BRIEF DESCRIPTION OF THE DRAWINGS

The present invention is described in greater detail below on the basis of embodiments and of the drawings in which.

DETAILED DESCRIPTION

Figure 1:
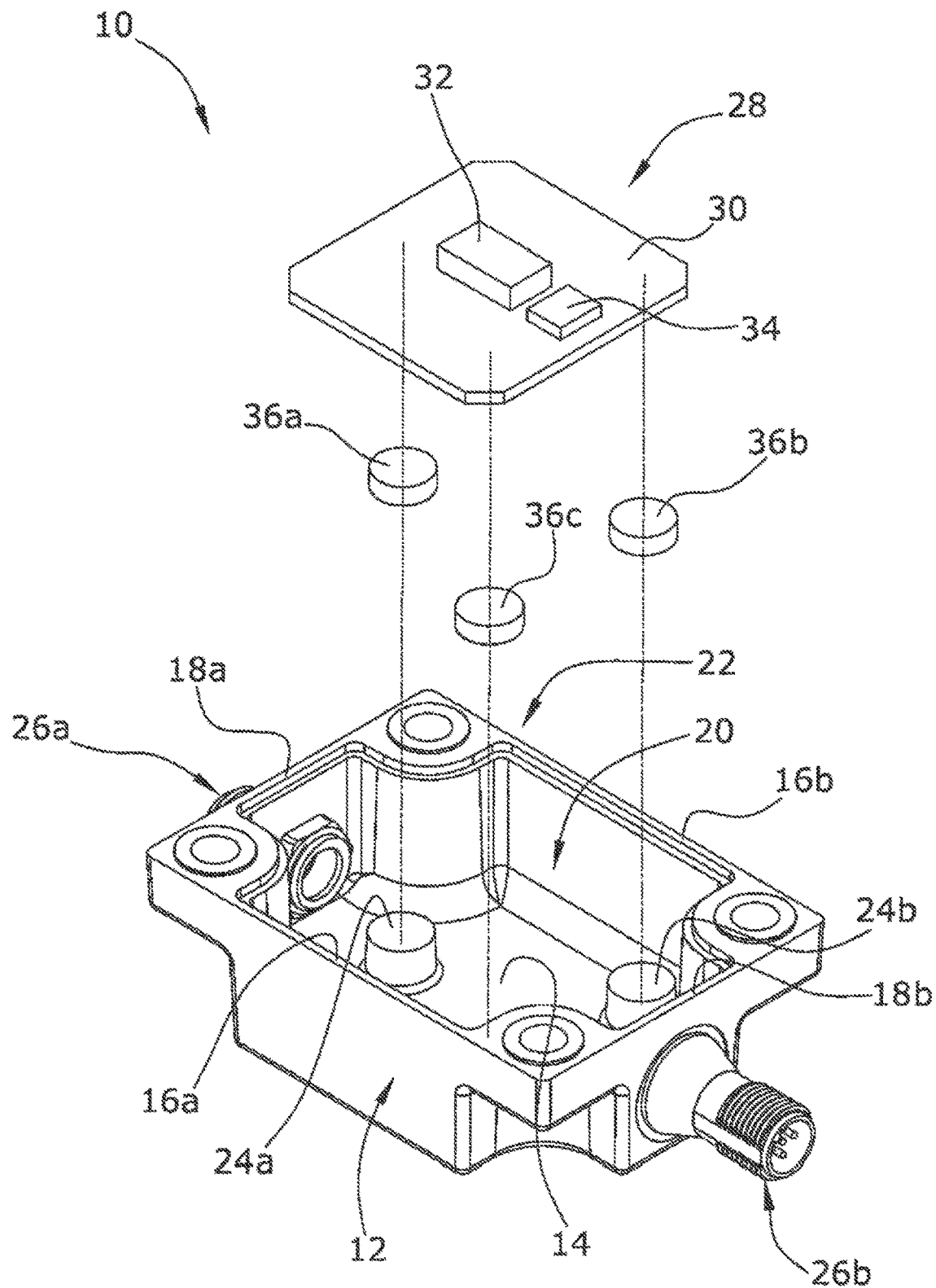
FIG. 1 shows an exploded view of a sensor device according to the present invention in a non-potted state.
Figure 2:
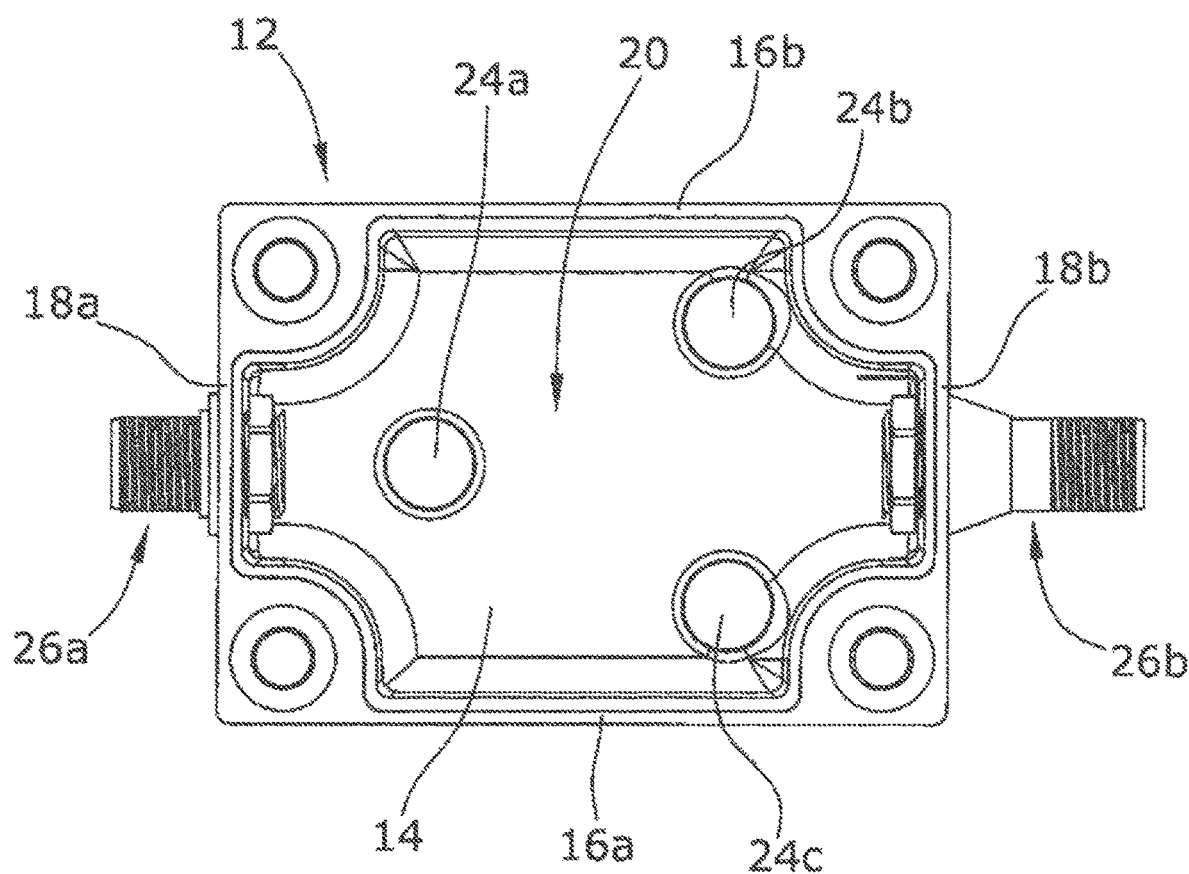
FIG. 2 shows a top view of a housing of the sensor device of FIG. 1.
Figure 3:
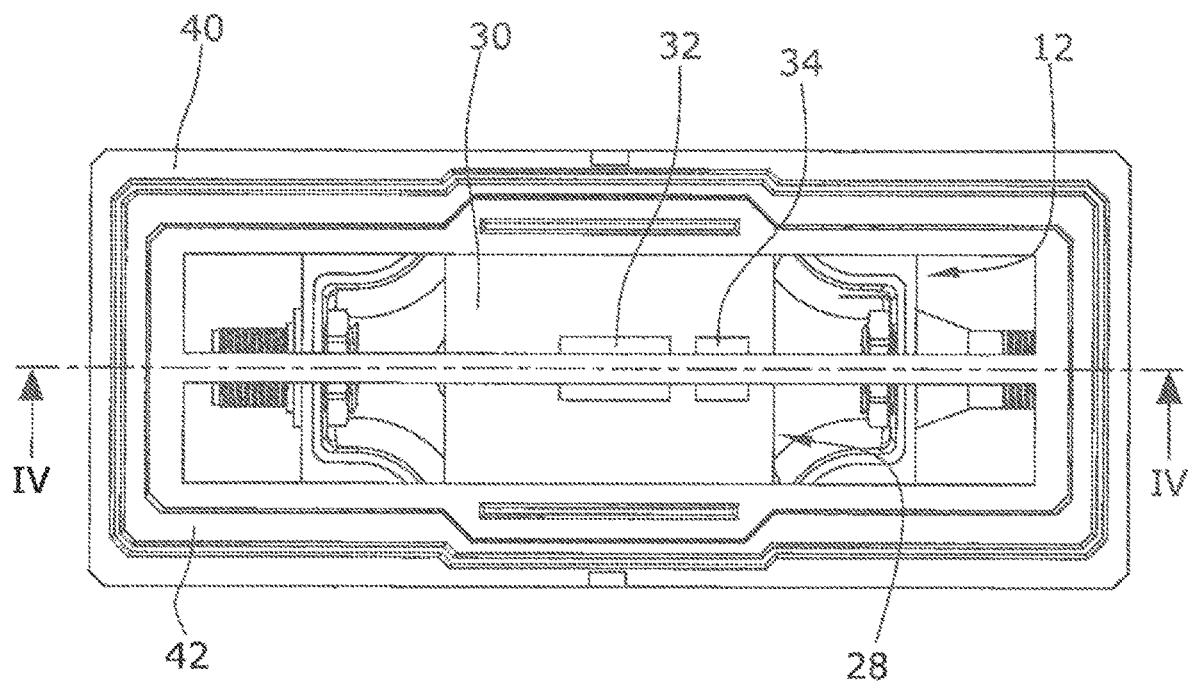
FIG. 3 shows a top view of the sensor device of FIG. 1, wherein a positioning device and a holding device are attached to the sensor device.

According to the present invention, at least one mounting element is provided via which the sensor module is mounted in the housing. The at least one mounting element can, for example, be adhered both to the sensor module and to the housing for providing a reliable mounting of the sensor module during the assembly of the sensor device. According to the present invention, the potting compound filling the housing and enclosing the sensor module has a hardness, in the cured state, which is greater than the hardness of the at least one mounting element and less than the hardness of the housing. Since the potting compound has a greater hardness than the at least one mounting element, the sensor module is held in the housing essentially via the potting compound. According to the present invention, the hardness of the potting compound is relatively small so that the potting compound acts as an oscillation damper for the sensor module and decouples, with regard to oscillations, the sensor module from the housing. Shocks introduced into the housing from outside are thus not transmitted to the sensor module or transmitted only in a considerably dampened manner. This provides a reliable detecting of the physical variable by the motion-sensitive sensor element of the sensor device, in particular even in high-shock environments. The motion-sensitive sensor element can here, for example, be an acceleration sensor, an inertia sensor, or a gyroscope, and detect, for example, an acceleration or an inclination of the sensor device.

In an embodiment of the present invention, the sensor module can, for example, be supported without any contact to the housing. The sensor module is thus not in direct contact to the housing. This provides a reliable decoupling with regard to oscillations of the sensor module from the housing and thus a particularly reliable detecting of the physical variable.

At least one mounting boss is advantageously provided in the housing to which the sensor module is mounted via the at least one mounting element. The number of the mounting bosses here corresponds to the number of mounting elements. The mounting bosses provide a reliable mounting of the sensor module during assembly, wherein the mounting bosses vertically projecting from the housing wall nevertheless allow for a particularly efficient decoupling, with regard to oscillations, of the sensor module from the housing.

In an advantageous embodiment of the present invention, the at least one mounting element can, for example, have a hardness of maximum 45 Shore 00. The at least one mounting element can, for example, have a hardness in the range of 30 Shore 00 to 40 Shore 00. The potting compound advantageously has a hardness in the range of at least 20 Shore A and at most 45 Shore A. The potting compound can, for example, have a hardness in the range of 25 Shore A to 40 Shore A. The at least one mounting element is thus significantly softer than the potting compound so that the sensor module is nearly completely supported by the potting compound. The potting compound which is here also relatively soft provides for a particularly effective oscillation damping. The mounting element can, for example, be made from a viscoelastic polyurethane, and the potting compound can, for example, be made from a polybutadiene.

A relatively large quantity of moisture can be present in the potting compound since the potting compound is typically made from a relatively hydrophilic material. As a protection against moisture, the sensor module can, for example, be coated with a protective layer for preventing electrical shorting and/or corrosion of the electrical connections caused by the moisture.

The method according to the present invention for assembling a sensor device comprises the following method steps:
- Inserting the sensor module into the housing, wherein the sensor module is mounted to the housing via the at least one mounting element;
- Attaching a holding device which abuts a sensor module top side located opposite the at least one mounting element and which presses the sensor module against the at least one mounting element;
- Filling the potting compound into the housing; and
- Removing the holding device.

The holding device here prevents the sensor module from slipping and/or being lifted from the at least one mounting boss when the potting compound is filled in. The holding device in particular provides that the sensor module is not in direct contact to the housing. An efficient decoupling, with regard to oscillations, of the sensor module from the housing is thus provided, whereby an exact and reliable detecting of the physical variable by the sensor device according to the present invention is provided.

The sensor module can, for example, be reliably aligned and positioned in a simple manner by a positioning element at least during the inserting the sensor module into the housing. It is here in particular provided that the sensor module is not in direct contact to the housing.

The method for assembling the sensor device advantageously comprises the following method steps:
- Filling-in the potting compound until a sensor module bottom side, but not the sensor module top side, is enclosed by the potting compound;
- At least partially curing the potting compound;
- Removing the holding device; and
- Filling-in the potting compound at least until the sensor module is completely enclosed by the potting compound.

The two-stage filling-in of the potting compound here provides that the sensor module is reliably held in the housing when the holding device is removed. The sensor module is thus prevented from slipping and/or being lifted from the at least one mounting boss when the holding device is removed.

An exemplary embodiment of a sensor device according to the present invention for detecting a physical variable is described below under reference to the accompanying drawings.

The sensor device 10 according to the present invention comprises a housing 12 having a horizontal housing bottom wall 14, two vertical housing side walls 16a,b located opposite each other in a transverse direction, and two housing front walls 18a,b located opposite each other in a longitudinal direction. The housing bottom wall 14, the two housing side walls 16a,b, and the two housing front walls 18a,b define a housing internal space 20 which is open on a housing top side 22. The housing 12 can, for example, be made from a metal or from a hard plastic material.

Three mounting bosses 24a-c are provided on the housing bottom wall 14. The three mounting bosses 24a-c vertically project from the housing bottom wall 14 towards the housing top side 22. In each of the two opposite housing front walls 18a,b, a connector plug 26a,b is arranged which extends through the corresponding housing front wall 18a,b and via which the sensor device 10 is configured to be electrically contacted from outside.

A sensor module 28 is arranged in the housing internal space 20. The sensor module 28 comprises a module board 30. A motion-sensitive sensor element 32 is arranged on the module board 30. The sensor element 32 can, for example, be an accelerator sensor, an inertia sensor, or a gyroscope. The sensor module 28 comprises a single sensor element 32 in the present exemplary embodiment. It is also conceivable, however, that a plurality of sensor elements are arranged on the module board 30. The module board 30 also has arranged thereon an evaluation electronics 34 which is electrically connected to the sensor element 32 as well as to the two connector plugs 26a,b via connecting cables (which are not illustrated in detail in the drawings).

The sensor module 28 is mounted to the mounting bosses 24a-c of the housing 12 via three mounting elements 36a-c. Each mounting element 36a-c is here mounted to both the module board 30 of the sensor module 28 and to a mounting boss 24a-c, typically via an adhesive connection. In the present exemplary embodiment, the mounting elements 36a-c are disk-shaped, have a thickness of approximately 3 mm, and are made from a viscoelastic polyurethane, in particular from Sorbothane® having a hardness of 40 Shore 00. The mounting elements 36a-c and in particular the mounting bosses 24a-c are configured so that the module board 30 is positioned at approximately a half vertical height of the housing internal space 20 and is not in direct contact to the housing 12. The sensor module 28 is coated with a protective layer 37 as a protection against moisture.

Figure 5:
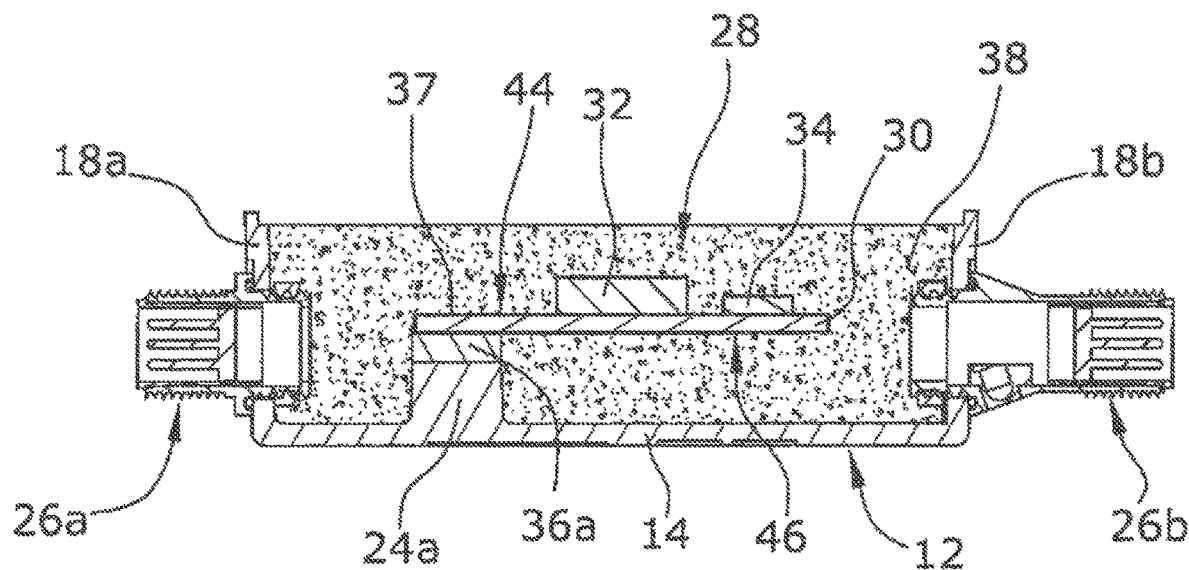
FIG. 5 shows the sensor device of FIG. 4, wherein the holding device is removed and the housing is completely filled with the potting compound.

In the finally assembled state of the sensor device 10 according to the present invention, as shown in FIG. 5, the housing internal space 20 is filled with a potting compound 38 which encloses the sensor module 28 on all sides. The housing internal space 20 can, for example, be essentially completely filled with the potting compound 38. The potting compound 38 has a hardness in the cured state which is greater than the hardness of the mounting elements 36a-c and less than the hardness of the housing 12. The potting compound 38 in the present exemplary embodiment is made from a polybutadiene and, in the cured state, has a hardness of 25 Shore A to 40 Shore A.

According to the present invention, the sensor module 28 is thus exclusively supported via the potting compound 38 and the mounting elements 36a-c and is thus arranged in the housing internal space 20 without any contact to the housing 12. Since the potting compound 38 and the mounting elements 36a-c have a relatively small hardness, the sensor module 28 is decoupled, with regard to oscillations, from the housing 12. This provides an interference-free and reliable detecting of the physical variable by the sensor device 10 according to the present invention, in particular even in high-shock environments.

During assembly of the sensor device 10 according to the present invention, the connector plugs 26a,b are first mounted to the housing 12. The not yet mounted sensor module 28 is subsequently electrically connected to the inside of the connector plugs 26a,b via the connecting cables (which are not illustrated in detail in the drawings). The exposed connections of the sensor module 28 are subsequently coated with the protective layer. The remaining sensor module 28 is already coated with the protective layer before assembly.

In the following assembly step, the mounting elements 36a-c are mounted to the corresponding mounting bosses 24a-c, for example, the mounting elements 36a-c are adhered to the mounting bosses 24a-c.

The connecting cables are further mounted to the housing bottom wall 14, for example, with an adhesive tape.

A positioning device 40 is subsequently attached to the housing 12, via which the sensor module 28 is guided when it is inserted into the housing 12. The sensor module 28 is laterally exactly positioned and aligned in the housing internal space 20 via the positioning device 40. The positioning device 40 in particular prevents a direct contact between the sensor module 28 and the housing 12. The sensor module 28 is inserted into the housing 12, wherein the sensor module 28 is placed onto the mounting elements 36a-c and mounted thereto, for example, via an adhesive connection.

Figure 4:
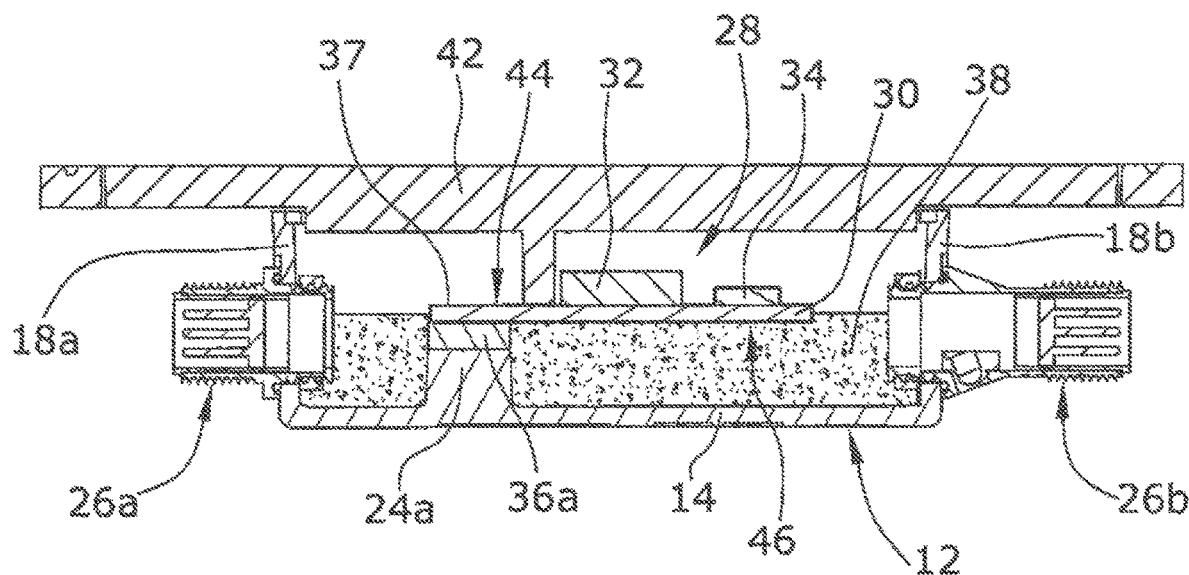
FIG. 4 shows a cross-sectional view of the sensor device of FIG. 3 along line IV-IV, wherein the positioning device is removed and a housing of the sensor device is partially filled with a potting compound.

To prevent the sensor module 28 from being lifted from the mounting bosses 24a-c, in particular when the potting compound 38 is being filled into the housing 12, a holding device 42 is attached which abuts a top side 44 of the sensor module 28 located opposite the mounting elements 36a-c as is shown in FIG. 4. The holding device 42 is mounted to the housing 12 so that the sensor module 28 is pressed against the mounting elements 36a-c via the holding device 42.

The housing internal space 20 is then filled with the potting compound 38 in a multi-stage process. The positioning device 40 is first removed. Subsequently, in a first filling step, potting compound 38 is filled into the housing internal space 20 until a bottom side 46 of the sensor module 28 is enclosed by the potting compound 38. The first filling step is, however, stopped before the potting compound 38 covers the top side 44 of the sensor module 28. The potting compound 38 is subsequently cured until the hardness is sufficiently large so that the sensor module 28 is held by the potting compound 38 and the holding device 42 can be removed.

After the removal of the holding device 42 as is shown in FIG. 5, in a second filling step, the housing internal space 20 is essentially completely filled with potting compound 38 and the potting compound 38 is subsequently completely cured.

The present invention is not limited to embodiments described herein; reference should be had to the appended claims.

LIST OF REFERENCE NUMERALS

10 Sensor device
12 Housing
14 Housing bottom wall
16a,b Housing side walls
18a,b Housing front walls
20 Housing internal space
22 Housing top side
24a-c Mounting bosses
26a,b Connector plugs
28 Sensor module
30 Module board
32 Sensor element
34 Evaluation electronics
36a-c Mounting elements
37 Protective layer
38 Potting compound
40 Positioning device
42 Holding device
44 Top side sensor module
46 Bottom side sensor module

What is claimed is:

1. A sensor device for detecting a physical variable, the sensor device comprising:
   a housing;
   a sensor module arranged in the housing, the sensor module comprising a module board and at least one motion-sensitive sensor element which is arranged on the module board;
   a potting compound which at least partially fills the housing and which encloses the sensor module; and
   at least one mounting element via which the sensor module is mounted to the housing,
   wherein,
   the potting compound, in a cured state, has a hardness which is greater than a hardness of the at least one mounting element and less than a hardness of the housing.

2. The sensor device as recited in claim 1, wherein the sensor module is supported without any direct contact to the housing.

3. The sensor device as recited in claim 1, further comprising:
   at least one mounting boss arranged in the housing, the sensor module being mounted at the least one mounting boss via the at least one mounting element.

4. The sensor device as recited in claim 1, wherein the hardness of the at least one mounting element is a maximum of 45 Shore 00.

5. The sensor device as recited in claim 1, wherein the hardness of the potting compound is in a range of at least 20 Shore A to 45 Shore A.

6. The sensor device as recited in claim 1, wherein the sensor module is coated with a protective layer.

7. A method for assembling the sensor device as recited in claim 1, the method comprising:
   inserting the sensor module into the housing;
   mounting the sensor module to the housing via the at least one mounting element;
   attaching a holding device to abut a top side of the sensor module which is located opposite to the at least one mounting element, the holding device being configured to press the sensor module against the at least one mounting element;
   filling the potting compound into the housing; and
   removing the holding device.

8. The method as recited in claim 7, further comprising:
   aligning and positioning the sensor module via a positioning device at least during the inserting of the sensor module into the housing.

9. The method as recited in claim 7, further comprising:
   filling the potting compound into the housing until a bottom side of the sensor module, but not a top side of the sensor module, is enclosed by the potting compound;
   at least partially curing the potting compound;
   removing the holding device; and
   filling the potting compound into the housing at least until the sensor module is completely enclosed by the potting compound.

* * * * *